United States Patent [19]
Saegusa et al.

[11] Patent Number: 5,784,645
[45] Date of Patent: Jul. 21, 1998

[54] APPARATUS HAVING A FIRST MICROCOMPUTER FOR READING FIRST AND SECOND DATA FROM A NON-VOLATILE MEMORY AND PROCESSING THE SECOND DATA AND TRANSFERRING THE FIRST AND SECOND MICROCOMPUTER

[75] Inventors: Takashi Saegusa, Kawasaki; Hisatoshi Fujiwara, Koganei, both of Japan

[73] Assignee: Nikon Corporation, Tokyo, Japan

[21] Appl. No.: 497,250

[22] Filed: Jun. 30, 1995

[30] Foreign Application Priority Data

Sep. 7, 1994 [JP] Japan ................ 6-213403

[51] Int. Cl.$^6$ .................................................. G06F 13/00
[52] U.S. Cl. ................ 395/853; 395/200.3; 395/200.43; 395/566; 395/800.32
[58] Field of Search ................ 364/424.1, 133, 364/431.11; 395/200.07, 200.1, 700, 750, 200.02, 200.08, 500, 200.3, 200.43, 566, 800.32, 853; 396/71

[56] References Cited

U.S. PATENT DOCUMENTS

| | | | |
|---|---|---|---|
| 4,387,426 | 6/1983 | Roberts | 395/200.02 |
| 4,556,955 | 12/1985 | Wright et al. | 364/133 |
| 4,558,416 | 12/1985 | Pauwels et al. | 364/431.11 |
| 4,758,854 | 7/1988 | Saegusa | 396/71 |
| 4,896,262 | 1/1990 | Wayama et al. | 395/500 |
| 4,896,263 | 1/1990 | Brauninger et al. | 395/200.1 |
| 4,967,377 | 10/1990 | Masuda | 395/700 |
| 5,142,628 | 8/1992 | Okochi et al. | 395/200.07 |
| 5,204,963 | 4/1993 | Noya et al. | 395/750 |
| 5,222,227 | 6/1993 | Funabashi et al. | 395/200.07 |
| 5,285,389 | 2/1994 | Taylor | 364/424.1 |
| 5,390,316 | 2/1995 | Cramer et al. | 395/200.08 |

Primary Examiner—Thomas C. Lee
Assistant Examiner—Po C. Huang

[57] ABSTRACT

An optical system including a first microcomputer having a first communication terminal and a second communication terminal, a second microcomputer having a third communication terminal which is connected to the first communication terminal and sends and receives data, and a non-volatile memory having a fourth communication terminal which is connected to the second communication terminal and able to receive data, the non-volatile memory storing contents even after power to the non-volatile memory is turned OFF. The first microcomputer reads first data which is stored in a first region of the non-volatile memory, from the non-volatile memory via the second communication terminal, transfers the first data from the first communication terminal to the second microcomputer immediately after power is supplied, and uses second data, which is stored in a second region of the non-volatile memory and which has been transferred via the second communication terminal, to perform processing.

22 Claims, 10 Drawing Sheets

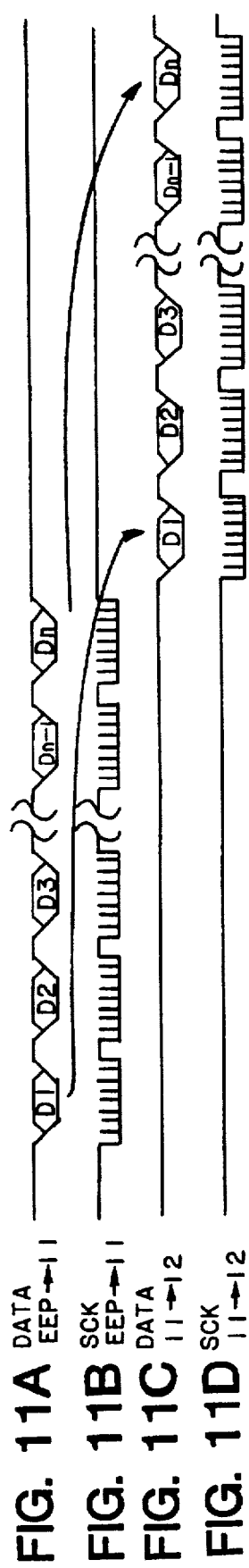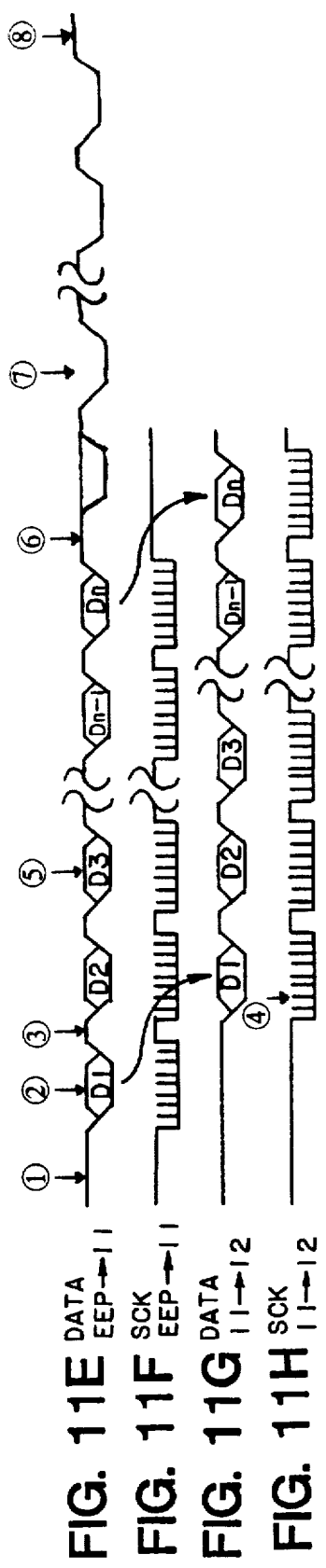

000000
APPARATUS HAVING A FIRST MICROCOMPUTER FOR READING FIRST AND SECOND DATA FROM A NON-VOLATILE MEMORY AND PROCESSING THE SECOND DATA AND TRANSFERRING THE FIRST AND SECOND MICROCOMPUTER

BACKGROUND OF THE INVENTION

1. Field of the Invention

The present invention relates to an optical system, such as a camera, having a data storage device which uses an EEPROM and a method thereof. The EEPROM is a non-volatile memory which maintains stored contents even after power to the EEPROM is turned OFF, and this type of optical system having such a storage device and method has come into wide use in recent years.

2. Description of the Related Art

A first conventional optical system has a data storage device which includes an EEPROM accessed by multiple microcomputers, and communication terminals for the EEPROM are connected to a common communication line. A second conventional optical system has multiple microcomputers each with its own EEPROM. The multiple microcomputers share each EEPROM.

However, the first conventional optical system has a drawback in that unrestricted access is difficult because the communication terminals of the EEPROM are connected to a common communication line between the microcomputers. In the second conventional optical system, when the respective microcomputers are each given their own EEPROM, multiple EEPROMs are needed, resulting in disadvantages in terms of packaging space and cost.

SUMMARY OF THE INVENTION

Accordingly, it is an object of the present invention to provide an optical system which overcomes the problems of the conventional optical systems as described above.

It is a further object of the present invention to provide an optical system with which communication can be conducted freely with a single EEPROM.

It is another object of the present invention to provide an optical system which is reduced in both size and cost as compared to conventional optical systems.

Additional objects and advantages of the invention will be set forth in part in the description which follows and, in part, will be obvious from the description, or may be learned by practice of the invention.

The foregoing and other objects of the present invention are achieved by an optical system which includes a first microcomputer having a first communication terminal and a second communication terminal, a second microcomputer having a third communication terminal which is connected to the first communication terminal and sends and receives data, and a non-volatile memory having a fourth communication terminal which is connected to the second communication terminal and able to receive data, the non-volatile memory storing contents even after power to the same is turned OFF. The first microcomputer reads first data which is stored in a first region of the non-volatile memory, from the non-volatile memory via the second communication terminal, transfers the first data from the first communication terminal to the second microcomputer immediately after power is supplied, and uses second data, which is stored in a second region of the non-volatile memory and which has been transferred via the second communication terminal, to perform processing.

The first microcomputer transfers the first data to the second microcomputer via the first communication terminal at the same time as it reads the first data via the second communication terminal.

Further, the first microcomputer accesses the non-volatile memory depending on the processed contents after accessing the non-volatile memory immediately after power is supplied, and does not transfer the first data to the second microcomputer after the first data has been transferred immediately after power is supplied.

The communication terminals will not affect each other even if some type of communication error occurs, since the microcomputers and the EEPROM are independent. Further, the first microcomputer transfers the first data to the second microcomputer via the first communication terminal at the same time as it reads the first data via the second communication terminal, so that the communication method is simple. Also, the first data, which is stored in the EEPROM which is connected to the first microcomputer, is transferred to the second microcomputer immediately after power is supplied, and exchange of the first data is not performed thereafter, so that the communication method is again simple.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 11A through 11H are data transfer timing charts for when data stored in an EEPROM are transferred on a shared line and when the data are transferred on an independent line according to the embodiment of the present invention.

DESCRIPTION OF THE PREFERRED EMBODIMENTS

Figure 1:
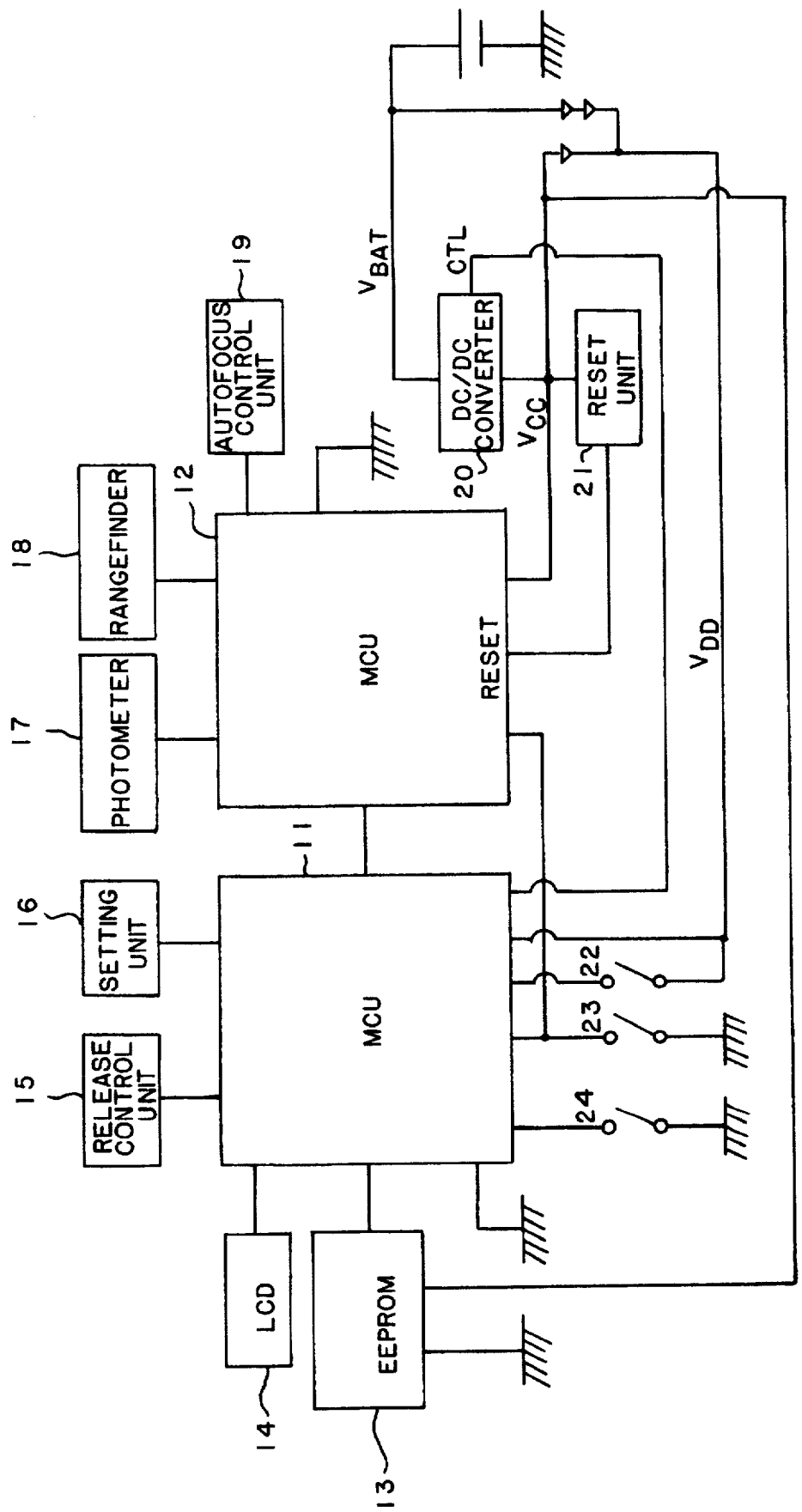
FIG. 1 is a block diagram of an optical system according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of an optical system according to an embodiment of the present invention. The optical system includes first and second microcomputers 11 and 12, respectively (hereafter referred to as MCUs). An EEPROM 13 stores camera setting and control data, as well as adjustment data for autoexposure (AE) and autofocus (AF). A liquid crystal display (LCD) 14 displays the camera setting and control data, as well as statuses of the camera. The system further includes a release control unit 15, a setting unit 16 comprising a setting button, a setting dial and connected accessories, a photometer 17, a rangefinder 18, and an AF control unit 19. A DC/DC converter 20 generates the power source VCC for MCU 11, MCU 12 and the EEPROM 13. A reset unit 21, a main switch 22, a half-depression switch 23, and a release switch 24 are also provided in the optical system. MCU 11 and MCU 12, as well as MCU 11 and the EEPROM 13, are connected by independent communication lines.

Figure 2:
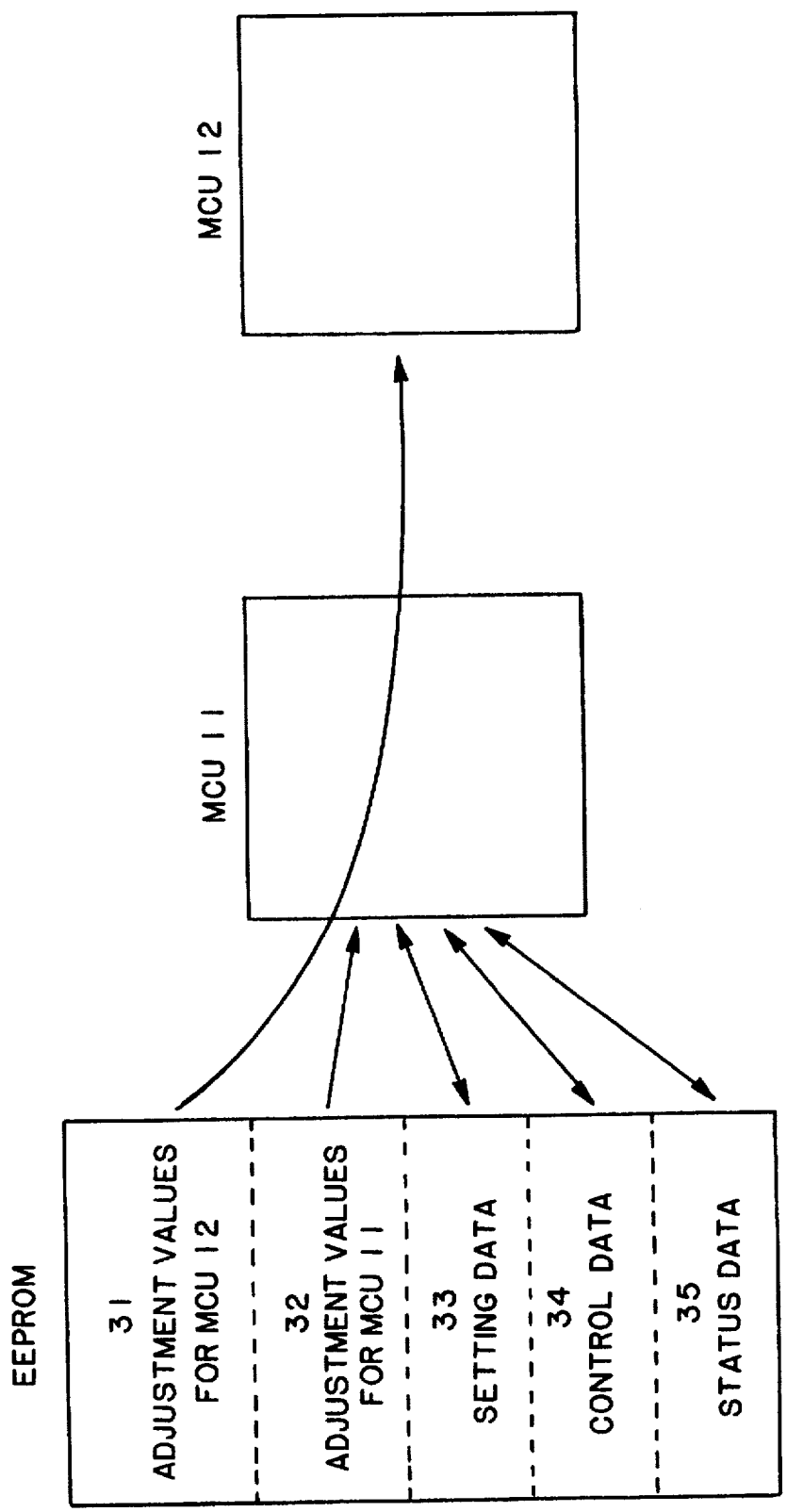
FIG. 2 is a diagram which shows EEPROM data flow according to the embodiment of the present invention.

FIG. 2 is a diagram which shows the memory allotment and the data flow of the EEPROM 13 of the preferred embodiment of the present invention. Adjustment value block 31 for MCU 12, stored in EEPROM 13, contains the data for MCU 12 to perform AE and AF computation and control. Adjustment value block 32 for MCU 11, stored in EEPROM 13, contains the data for MCU 11 to perform release control. Set data block 33, stored in EEPROM 13, contains the results of setting performed by the setting unit 15 and control data block 34 contains the various types of control data. Status data block 35 contains the camera statuses, such as whether or not there is film and the battery status.

The arrows in FIG. 2 indicate the flow of data. Only reading of adjustment data from the EEPROM 13 is performed in order to prevent inadvertent rewriting, and both writing to and reading from the EEPROM 13 of setting, control and status data are performed as necessary.

Figure 3:
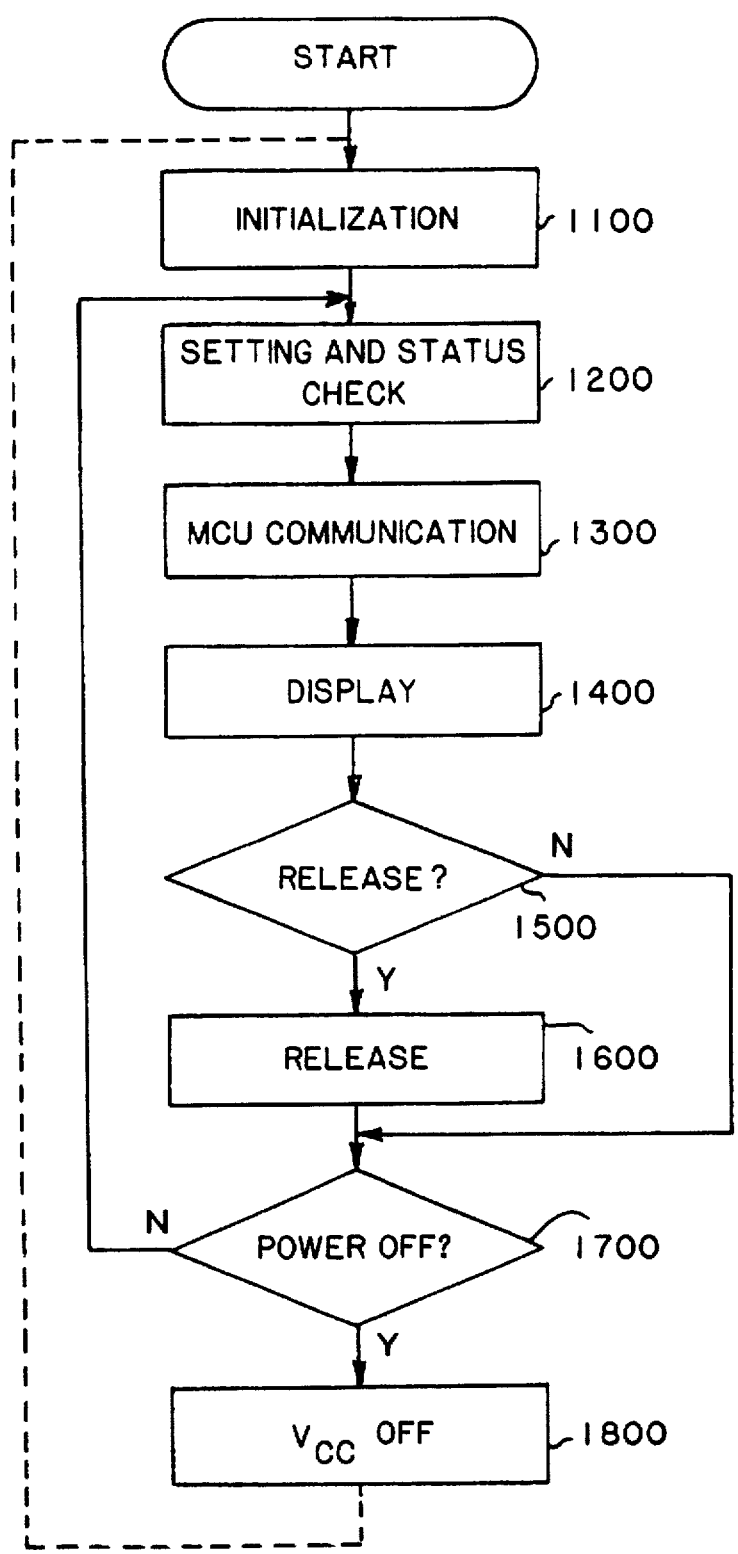
FIG. 3 is a flow chart which shows the main routine of MCU 12.

FIG. 3 is a flow chart which shows the main routine of MCU 11. In step S1100, there is a subroutine call of the initialization routine, internal initialization of MCU 11 is performed, adjustment, setting, control and status data are read from the EEPROM, transfer of each type of data is performed, and the process proceeds to step S1200. In step S1200, there is a subroutine call of the setting and status check routine, setting of each type of parameter in MCU 11 is performed according to the status of the setting unit 16, and the process proceeds to step S1300. In step S1300, there is a subroutine call of the MCU communication routine, set values are sent to MCU 12, control values are received from MCU 12, and the process proceeds to step S1400.

In step S1400, there is a subroutine call of the display routine. Further, the set values and the status data, which were determined in step S1200, as well as the display data, which correspond to the control values received in step S1300, are obtained, display is performed, and the process proceeds to step S1500.

In step S1500, depending on the status of the release switch 24, step S1600 is proceeded to when the switch is ON, and step S1700 is proceeded to when the switch is OFF.

In step S1600, the release control unit 15 performs a series of release processes based on the set values determined in step S1200 and the control values received in step S1300. In step S1700, a check is made as to whether a power OFF condition has been established. If it has been established, the process proceeds to step S1800, and if it has not been established, return is made to step S1200.

In step S1800, setting, control and status data are written to the EEPROM 13, the DC/DC converter 20 is controlled to turn the voltage VCC OFF, and MCU 11 itself is switched to a standby mode. Cancellation of the MCU 11 standby mode is performed by interruption of the main switch 22 and the half-depression switch 23. During cancellation, processing is restarted from the top of the flow chart in FIG. 3.

Figure 4:
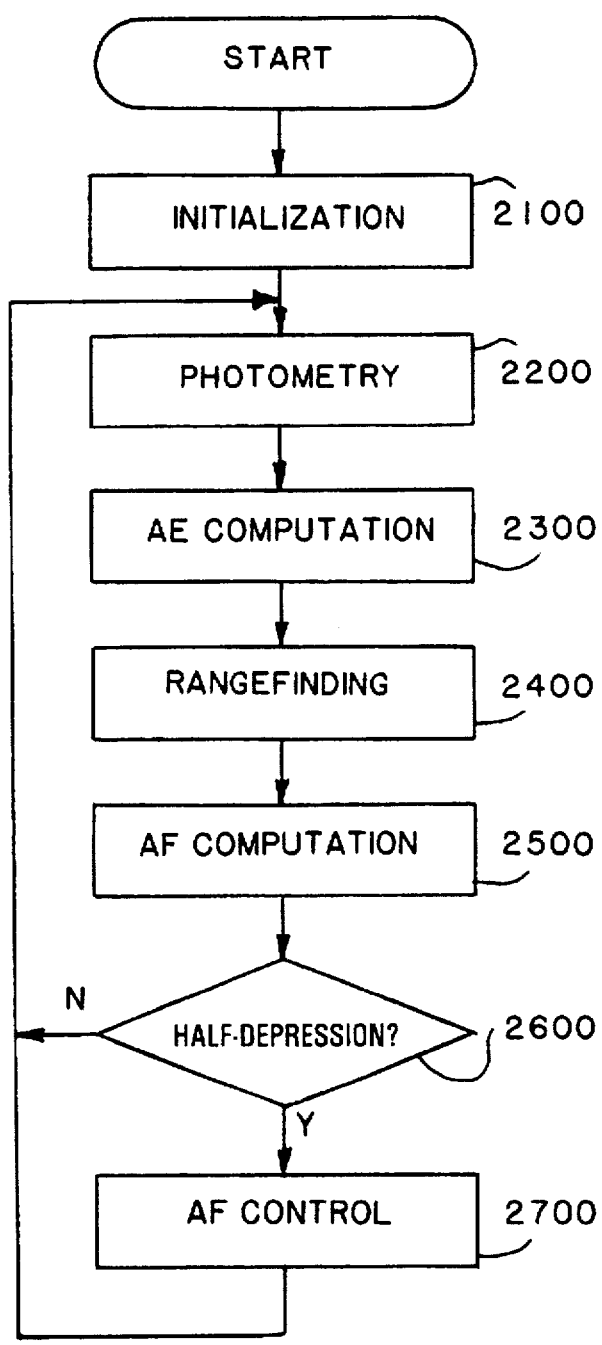
FIG. 4 is a flow chart of the first microcomputer initialization routine according to the embodiment of the present invention.

FIG. 4 is a flow chart which shows the main routine of MCU 12. In step S2100, there is a subroutine call of the initialization routine, internal initialization of MCU 12 is performed, and reading of the adjustment values of the EEPROM 13 is performed via MCU 11, and the process proceeds to step S2200.

In step S2200, there is a subroutine call of the photometry routine, the photometric output from the photometer 17 is converted into brightness data through A/D conversion, and the process proceeds to step S2300.

In step S2300, there is a subroutine call of the AE computation routine, APEX computation (for determining shutter speed, aperture size and film sensitivity) is performed according to the adjustment data received in step S2100 and the brightness data obtained in step S2200, an AE control value is obtained, and the process proceeds to step S2400.

In step S2400, there is a subroutine call of the rangefinding routine, output from the rangefinder 18 is accumulated and converted to distance data, and the process proceeds to step S2500.

In step S2500, there is a subroutine call of the AF computation routine. AF computation is performed according to the adjustment data received in step S2100 and the distance data obtained in step S2400, an AF control value is obtained, and the process proceeds to step S2600.

In step S2600, the status of the half-depression switch 23 is checked. Step S2700 is proceeded to when the half-depression switch 23 is ON and step S2200 is proceeded to when it is OFF.

In step S2700, there is a subroutine call of the AF control routine, the AF control unit 19 is controlled based on the AF control value obtained in step S2500, the focus operation is performed, and there is a return to step S2200.

Figure 5:
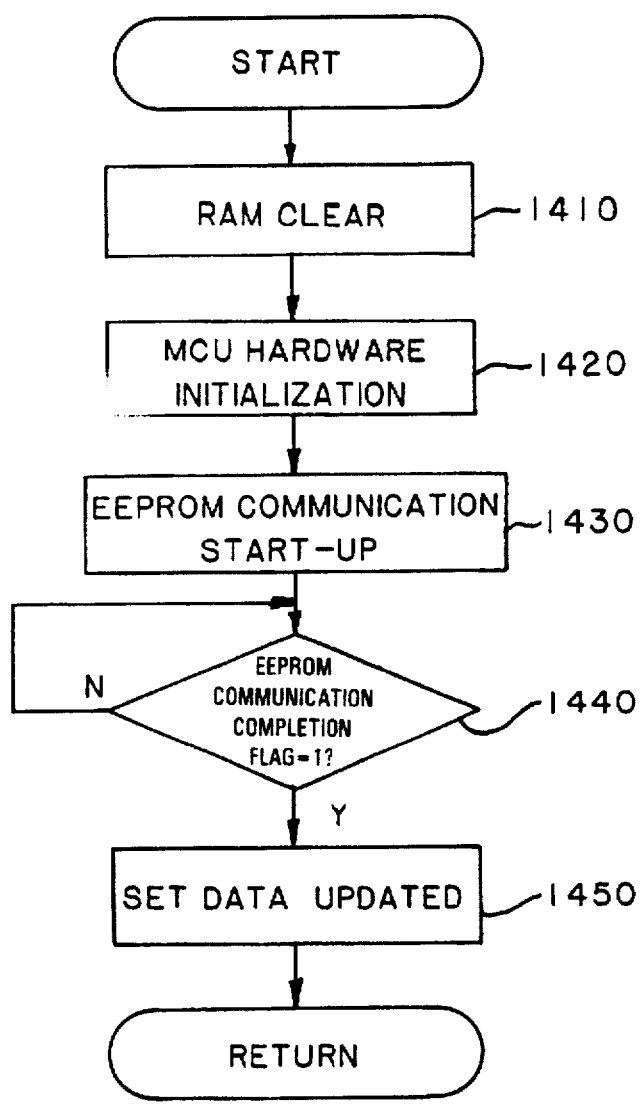
FIG. 5 is a flow chart of the first microcomputer initialization routine according to the embodiment of the present invention.

FIG. 5 is a flow chart which shows the initialization routine of MCU 11, for which there is a subroutine call from step S1100 in FIG. 3.

In step S1410, the RAM area of MCU 11 is cleared, and the process proceeds to step S1420.

In step S1420, the setting of the port functions, the timer counter and interruption of MCU 11 is performed, and the process proceeds to step S1430.

In step S1430, data reading from the EEPROM 13 is started, and the process proceeds to step S1440. Reading is started by the transmission of a read command to the EEPROM 13, and the communication operation uses the hardware functions of MCU 11. An interruption is generated for each completed byte of communication with the EEPROM 13, and the communication operation uses the hardware functions of MCU 11. An interruption is generated for each completed byte of communication with the EEPROM 13, and a communication completion interruption routine, which will be explained using FIG. 6, is started.

In step S1440, a check is performed as to whether reading from the EEPROM 13 has been completed. If it has been completed, the process proceeds to step S1450, and if it has not been completed, step S1440 is repeated.

In step S1450, part or all of the set values from the setting unit 16 status are updated, and a return is performed.

Figure 6:
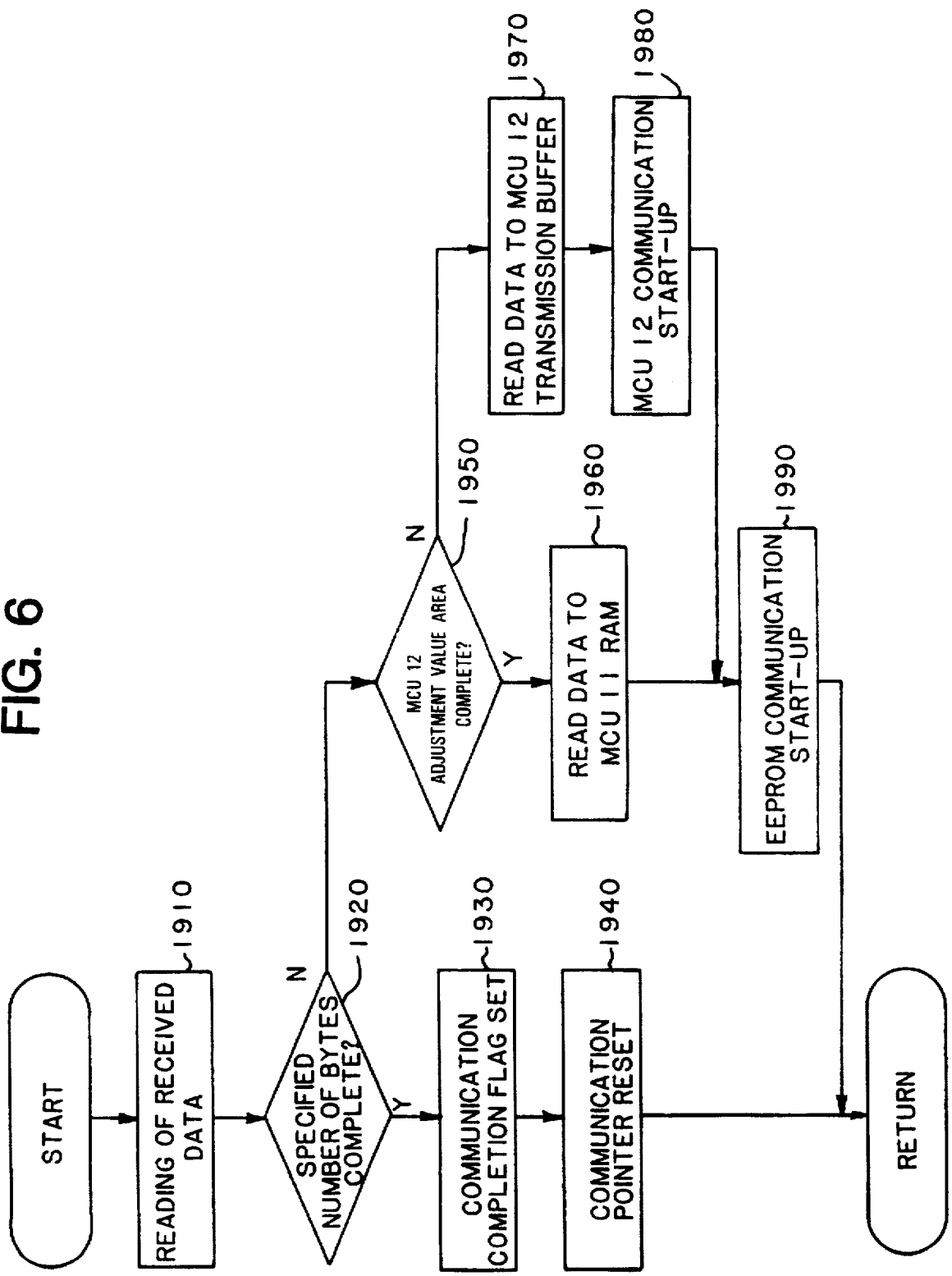
FIG. 6 is a flow chart of the first microcomputer interruption routine when the transfer of one byte has been completed according to the embodiment of the present invention.

FIG. 6 is a flow chart which shows the communication completion interruption processing routine generated when one byte of communication with the EEPROM 13 has been completed.

In step S1910, the data received from the EEPROM 13 is read and in step S1920, a check is performed as to whether a specified number of bytes of communication has been completed. If it has been completed, the process proceeds to step S1930, and if it has not been completed, the process proceeds to step S1950.

In step S1930, the flag for completion of communication with the EEPROM 13 is set, and in step S1940, the communication data pointer and the communication counter for communication with the EEPROM 13 are set, and a return is performed.

In step S1950, a check is performed as to whether reading of the adjustment value area for MCU 12 has been completed. If it has been completed, the process proceeds to step S1960, and if is has not been completed, the process proceeds to step S1970.

In step S1960, the read data is stored in the specified RAM of MCU 11, and the process proceeds to step S1990.

Figure 7:
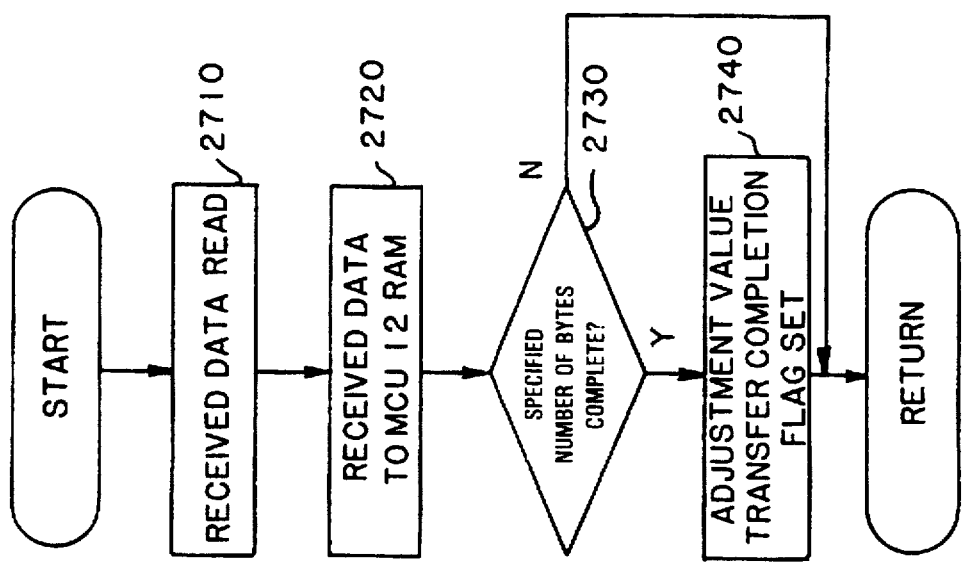
FIG. 7 is a flow chart which shows a second microcomputer communication response interruption routine according to the embodiment of the present invention.

In step S1970, the read data is stored in a buffer for transmission to MCU 12, and in step S1980, start-up of communication with MCU 12 is performed. Communication is performed using the hardware functions of MCU 11. Through this communication start-up, an interruption is generated in MCU 12, and the communication response interruption routine, which will be explained using FIG. 7, is started. As shown in FIGS. 11E through 11H, this makes it possible to simultaneously transfer data to MCU 12 while data is being read from the EEPROM 13. In step S1990, communication with the EEPROM 13 is started up, and a return is performed.

FIG. 7 is a flow chart of the communication response interruption subroutine of MCU 12, which is in response to the communication start-up of the adjustment value transfer from MCU 11. In step S2710, the data received from MCU 11 is read, and in step S2720, the read data is stored in the specified RAM of MCU 12. In step S2730, a check is performed as to whether a specified number of bytes of communication has been completed. If it has been completed, the process proceeds to step S2740, and if it has not been completed, a return is performed. In step S2740, the flag for the completion of adjustment value transfer is set, and return is performed.

Figure 8:
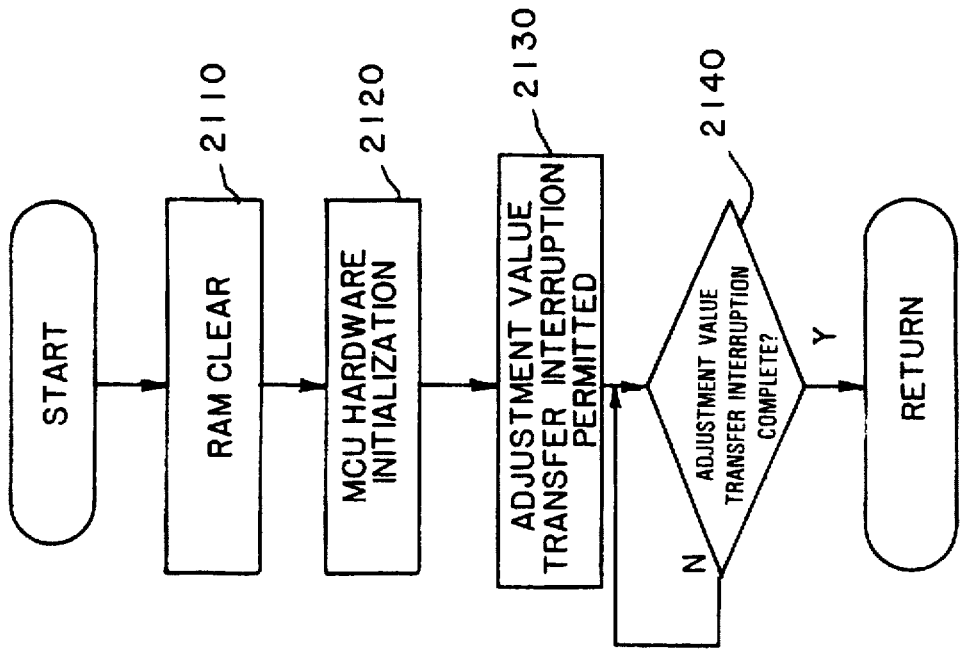
FIG. 8 is a flow chart of the second microcomputer initialization routine according to the embodiment of the present invention.

FIG. 8 is a flow chart for the MCU 12 initialization routine, for which there is a subroutine call from step S2100 in FIG. 4. In step S2110, the RAM area of MCU 12 is cleared, and the process proceeds to step S2120. In step S2120, the setting of the port functions, the timer counter and interruption of MCU 12 are performed, and in step S2130, communication interruption of the adjustment value transfer from MCU 11 is permitted. In step S2140, a check is performed as to whether adjustment value transfer from MCU 11 has been completed. If it has been completed, a return is performed, and if it has not been completed, step S2140 is repeated.

Figure 9:
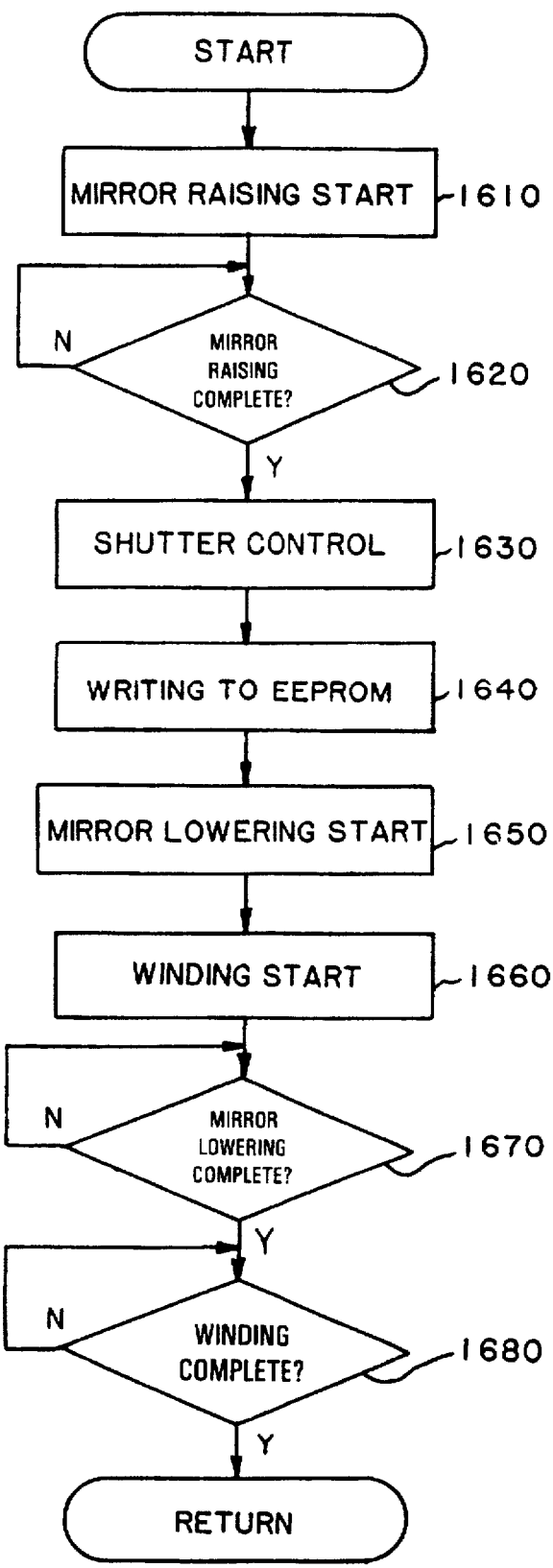
FIG. 9 is a flow chart which shows the MCU 11.

FIG. 9 is a flow chart which shows the MCU 11 release routine, for which there is a subroutine call from step S1600 in FIG. 3. In step S1610, raising of a mirror in the optical system is started using the release control unit 15. The release control unit 15 provides the control for raising/lowering of the mirror used in viewfinding and other photographic functions, and aperture, shutter and film feeding functions after the shutter has been released. The release control unit comprises a motor suitable for these controls, magnet(s), a driver for driving these elements, and a sensor for detecting the drive status.

In step S1620, a mirror raising completion check is performed using the release control unit 15. If it has been completed, the process proceeds to step S1630, and if it has not been completed, the process repeats to step S1620.

In step S1630, shutter control is performed using the release control unit 15, and in step S1640, writing of the setting, control and status data to the EEPROM 13 is performed, making it possible to read the various types of nearby data in the next start-up, even during power outages out of the normal sequence.

In step S1650, mirror lowering is started using the release control unit 15, and in step S1660, film winding is started using the release control unit 15. In step S1670, a mirror completion check is performed using the release control unit 15. If it has been completed, the process proceeds to step S1680, and if it has not been completed, step S1670 is repeated.

In step S1680, a winding completion check is performed using the release control unit 15. If it has been completed, a return is performed, and if it has not been completed, step S1680 is repeated.

Figure 10:
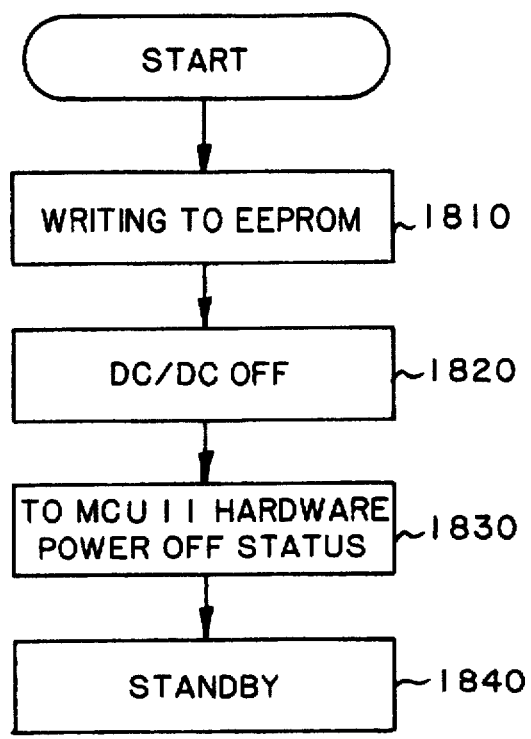
FIG. 10 is a flow chart of the first microcomputer VCC OFF routine according to the embodiment of the present invention.

FIG. 10 is a flow chart which shows the MCU 11 VCC OFF routine, for which there is a subroutine call from step S1800 in FIG. 3.

In step S1810, writing of setting, control and status data to the EEPROM 13 is performed, and in step S1820, the DC/DC converter 20 is controlled to stop VCC power supply.

In step S1830, the settings of the MCU 11 port and the timer hardware are changed in preparation for standby, and in step S1840, the MCU 11 itself is switched to a standby mode.

FIGS. 11A through 11H are timing charts for when the EEPROM 13 data is transferred to MCU 12 via MCU 11, where FIGS. 11A through 11D involve the case where the EEPROM 13 data is sent to MCU 12 after all the EEPROM 13 data has been read into MCU 11 at once. FIGS. 11E through 11H involve the case where the EEPROM 13 data is sent to MCU 12 while the EEPROM 13 data is being read by MCU 11, and where it is possible to greatly shorten the transfer time.

Reading data from the EEPROM 13 to MCU 11 and transferring data from MCU 11 to MCU 12 are both performed with a clock pulse cycle.

In FIGS. 11A through 11D, data D1~Dn are read from the EEPROM 13 to MCU 11 by the signal SCK EEP→11. When the reading of Dn is completed, data D1~Dn are transferred from MCU 11 to MCU 12 by the signal SCK 11→12.

In FIGS. 11E~11H, D1 is read from the EEPROM 13 to MCU 11 by the signal SCK EEP→11. Then, the signal SCK 11→12 is generated. The data are read from the EEPROM 13 synchronously with the SCK EEP→11, and at the same time, the data are transferred from MCU 11 to MCU 12 synchronously with the signal SCK 11→12. Upon completion of the transfer of Dn from MCU 11 to MCU 12, the signal SCK 11→12 stops. The signal SCK→11 is continuously generated, thereby carrying on the data reading from the EEPROM 13 to MCU 11.

An additional explanation concerning FIGS. 11E~11H is provided in the following.

(1) Communications are activated at step S1430 in FIG. 5.

(2) The EEPROM 13 data are read according to the clock.

(3) Upon completion of the data transfer, an interrupt occurs and the processing of step S1920 in FIG. 6 begins, changing the address of the jump at the Nth byte.

(4) In step S1980, the communications of MCU 12 are activated, and in step S1990, the communications of the EEPROM 13 are activated.

(5) The process is repeated for the same number of times as the number of data.

(6) The data are transferred to the RAM in MCU 11 but are not transferred to other portions of MCU 11 in step S1960.

(7) The number of data that are necessary are stored in MCU 11.

(8) When the transfer of the specified number of data has been completed, the communications pointer is reset. When the above processes have been completed, the processing proceeds to step S1150 from step S1140 in FIG. 5.

Moreover, if the communication lines are independent, even if, by chance, an error should occur in communication between MCU 11 and MCU 12, the communication line with the EEPROM 13 will not be affected, and there is also a benefit in that the adjustment values, which are among the most important data, will be protected.

As described above, the configuration is such that a non-volatile memory and a first microcomputer are connected to each other, and the first microcomputer and a second microcomputer are connected to enable reception of first data from the non-volatile memory by the second microcomputer via the first microcomputer, so there is only one non-volatile memory, making compactness possible. In addition, the first data is transferred from the non-volatile memory to the second microcomputer via the first microcomputer immediately after power is supplied, so that when the second microcomputer needs data, one need only stop the processing of the first microcomputer to perform data transfer.

When the first microcomputer reads first data from the non-volatile memory, the first data is transferred in sequence to the second microcomputer, so that transfer time is shortened.

In addition, data transfer is not performed to the second microcomputer after the first microcomputer has transferred data to the second microcomputer immediately after power is supplied, so that communication between the non-volatile memory and the first and second microcomputers is simple.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A system, comprising:

a non-volatile memory to store first and second data;

a first microcomputer connected to said non-volatile memory, to read the first and second data from said non-volatile memory, to process the second data, and to transfer the first data; and a second microcomputer connected to said first microcomputer, to process the first data received from said first microcomputer;

wherein said first microcomputer transfers the first data to said second microcomputer immediately after power is supplied to said first and second microcomputers and said non-volatile memory, and said second microcomputer stores the first data and performs the processing of the first data, and wherein said first microcomputer reads a first piece of a plurality of the first data from said non-volatile memory, said second microcomputer reads the first piece of the plurality of first data from said first microcomputer as said first microcomputer reads a second piece of the plurality of first data from said non-volatile memory, and said first microcomputer continuously reads a next piece of the plurality of the first data as said second microcomputer reads a current piece of the plurality of first previous to said next piece until all of the plurality of first data are read into said second microcomputer, said first microcomputer having an interrupt after each of the pieces of the plurality of first data are transferred from said non-volatile memory to said first microcomputer.

2. A system employing first and second data, comprising:

a first microcomputer having first and second communication terminals, to process the second data;

a second microcomputer having a third communication terminal connected to the first communication terminal, to process the first data; and a non-volatile memory having a fourth communication terminal connected to the second communication terminal, to store the first and second data;

wherein said first microcomputer reads the first and second data from the fourth communication terminal of said non-volatile memory via the second communication terminal, transfers the first data from the first communication terminal to the third communication terminal of said second microcomputer immediately after power is supplied to said first and second microcomputers and said non-volatile memory, and performs the processing of the second data, and said second microcomputer stores the first data and performs the processing of the first data, and wherein said first microcomputer reads a first piece of a plurality of the first data from said non-volatile memory, said second microcomputer reads the first piece of the plurality of first data from said first microcomputer as said first microcomputer reads a second piece of the plurality of first data from said non-volatile memory, and said first microcomputer continuously reads a next piece of the plurality of the first data as said second microcomputer reads a current piece of the plurality of first previous to said next piece until all of the plurality of first data are read into said second microcomputer, said first microcomputer having an interrupt after each of the pieces of the plurality of first data are transferred from said non-volatile memory to said first microcomputer.

3. An optical system, comprising:

a non-volatile memory to store first and second data;

a first microcomputer connected to said non-volatile memory, to read the first and second data from said non-volatile memory, to process the second data, and to transfer the first data; and a second microcomputer connected to said first microcomputer, to process the first data received from said first microcomputer;

wherein said first microcomputer transfers the first data to said second microcomputer immediately after power is supplied to said first and second microcomputers and said non-volatile memory, and said second microcomputer stores the first data and performs the processing of the first data.

4. The optical system as claimed in claim 3, wherein said first microcomputer reads the second data from said non-volatile memory after reading the first data from said non-volatile memory.

5. The optical system as claimed in claim 4, wherein said first microcomputer reads the second data from said non-volatile memory after transferring the first data to said second microcomputer.

6. The optical system as claimed in claim 3, wherein said first and second microcomputers have first and second random access memories, respectively, for storing the respective second and first data.

7. The optical system as claimed in claim 3, wherein said first microcomputer transfers the first data to said second microcomputer while reading the first and second data from said non-volatile memory.

8. The optical system as claimed in claim 3, wherein said first microcomputer transfers the first data to said second microcomputer after reading the first and second data from said non-volatile memory.

9. The optical system as claimed in claim 3, wherein said first microcomputer begins reading the first and second data by transmitting a read command to said non-volatile memory and generates an interruption after reading each byte of the first and second data from said non-volatile memory.

10. The optical system as claimed in claim 3, wherein the optical system is a camera, and said first microcomputer overwrites existing second data from said non-volatile memory with new second data from said non-volatile memory with each shutter release of the camera.

11. An optical system employing first and second data, comprising:

a first microcomputer having first and second communication terminals, to process the second data;

a second microcomputer having a third communication terminal connected to the first communication terminal, to process the first data; and a non-volatile memory having a fourth communication terminal connected to the second communication terminal, to store the first and second data;

wherein said first microcomputer reads the first and second data from the fourth communication terminal of said non-volatile memory via the second communication terminal, transfers the first data from the first communication terminal to the third communication terminal of said second microcomputer immediately after power is supplied to said first and second microcomputers and said non-volatile memory, and performs the processing of the second data, and said second microcomputer stores the first data and performs the processing of the first data.

12. The optical system as claimed in claim 11, wherein said first microcomputer reads the second data from said non-volatile memory after reading the first data from said non-volatile memory.

13. The optical system as claimed in claim 12, wherein said first microcomputer reads the second data from said non-volatile memory after transferring the first data to said second microcomputer.

14. The optical system as claimed in claim 11, wherein said first and second microcomputers have first and second random access memories, respectively, for storing the respective second and first data.

15. The optical system as claimed in claim 11, wherein said first microcomputer transfers the first data to said second microcomputer while reading the first and second data from said non-volatile memory.

16. The optical system as claimed in claim 11, wherein said first microcomputer transfers the first data to said second microcomputer after reading the first and second data from said non-volatile memory.

17. The optical system as claimed in claim 11, wherein said first microcomputer begins reading the first and second data by transmitting a read command to said non-volatile memory and generates an interruption after reading each byte of the first and second data from said non-volatile memory.

18. The optical system as claimed in claim 11, wherein the first data is autoexposure and autofocus control information and the second data is release control information pertaining to taking of a photograph.

19. The optical system as claimed in claim 11, wherein the optical system is a camera, and said first microcomputer overwrites existing second data from said non-volatile memory with new second data from said non-volatile memory with each shutter release of the camera.

20. A method of transferring first and second data in an optical system, said method comprising:

supplying power to a first microcomputer and a second microcomputer; and reading the first and second data from a non-volatile memory to the first microcomputer and transferring the second data from the first microcomputer to the second microcomputer immediately after supplying the power to the first and second microcomputers.

21. The method as claimed in claim 20, wherein said step of reading the first and second data further comprises the steps of:

clearing a random access memory area of the first microcomputer;

setting port functions of the first microcomputer;

generating a read command to the non-volatile memory to begin reading the first and second data from the non-volatile memory;

generating an interruption after each byte of the first and second data is read by the first microcomputer; and checking whether all of the first and second data has been read from the non-volatile memory.

22. The method as claimed in claim 21, wherein said step of reading the first and second data further comprises the steps of:

clearing a random access memory area of the second microcomputer;

setting port functions of the second microcomputer;

permitting communication interruption of the first data to be transferred from the first microcomputer; and checking whether all of the first data has been transferred from the first microcomputer to the second microcomputer.

* * * * *